United States Patent [19]

Endo et al.

[11] Patent Number: 4,676,966
[45] Date of Patent: * Jun. 30, 1987

[54] METHOD FOR THE PREPARATION OF A FINE POWDER OF SILICON CARBIDE

[75] Inventors: Morinobu Endo, Nagano; Minoru Takamizawa, Tokyo; Tatsuhiko Hongu, Kanagawa; Taishi Kobayashi, Niigata, all of Japan

[73] Assignee: Shin-Etsu Chemical Co., Ltd., Tokyo, Japan

[*] Notice: The portion of the term of this patent subsequent to Jun. 4, 2002 has been disclaimed.

[21] Appl. No.: 706,238

[22] Filed: Feb. 27, 1985

Related U.S. Application Data

[63] Continuation-in-part of Ser. No. 525,290, Aug. 22, 1983, abandoned.

[30] Foreign Application Priority Data

Aug. 25, 1982 [JP] Japan ................................ 57-147342

[51] Int. Cl.[4] ............................................. C01B 31/36
[52] U.S. Cl. ...................................... 423/345; 501/88; 501/90; 556/432
[58] Field of Search ..................... 423/345; 501/88, 90; 556/432

[56] References Cited

U.S. PATENT DOCUMENTS

| | | | |
|---|---|---|---|
| 4,117,057 | 9/1978 | Yajima et al. | 423/345 |
| 4,298,559 | 11/1981 | Baney et al. | 423/345 |
| 4,310,482 | 1/1982 | Baney | 423/345 |
| 4,404,153 | 9/1983 | Gaul, Jr. | 501/90 |
| 4,414,403 | 11/1983 | Schilling, Jr. et al. | 501/88 |
| 4,571,331 | 2/1986 | Endou et al. | 501/88 |

FOREIGN PATENT DOCUMENTS

| | | | |
|---|---|---|---|
| 592456 | 2/1960 | Canada | 423/345 |
| 1047180 | 12/1958 | Fed. Rep. of Germany | 423/345 |
| 79/00178 | 4/1979 | World Int. Prop. O. | 423/345 |

Primary Examiner—William R. Dixon, Jr.
Assistant Examiner—Steven Capella

[57] ABSTRACT

The invention provides a novel method for the preparation of a finely divided powder of silicon carbide as a promising material for sintered ceramic products of silicon carbide. The method comprises vapor-phase pyrolysis of a vaporizable organosilicon compound having, in a molecule, at least two, e.g. 2, 3 or 4, silicon atoms and at least one hydrogen atom directly bonded to the silicon atom but having no oxygen or halogen atom directly bonded to the silicon atom at a temperature of 750° C. or higher.

8 Claims, 4 Drawing Figures

METHOD FOR THE PREPARATION OF A FINE POWDER OF SILICON CARBIDE

BACKGROUND OF THE INVENTION

This is a continuation-in-part application from a co-pending U.S. application Ser. No. 525,290 filed Aug. 22, 1983 abandoned.

The present invention relates to a method for the preparation of a fine powder of silicon carbide or, more particularly, to a method for the preparation of a fine powder of silicon carbide by the vapor-phase pyrolysis of an organosilicon compound.

As is known, silicon carbide in a finely divided powdery form is a very promising material for the preparation of a sintered ceramic body highly resistant to heat and chemicals. It is essential that the silicon carbide powder has a purity as high as possible and a fine particle size distribution in the so-called submicron range in order that the sintered ceramic body thereof may have excellent performance as desired.

Several methods differing in principle have been proposed for the preparation of a silicon carbide powder suitable as a material for the sintered ceramic bodies of silicon carbide by satisfying the above mentioned requirements in the purity and particle size distribution including (1) a method in which so-called metallic silicon is reacted with carbon at a high temperature in an electric furnace and the thus obtained silicon carbide is finely pulverized, (2) a method of high-temperature vapor-phase pyrolysis of silane $SiH_4$ or a chlorine-containing silane, e.g. an organochlorosilane or trichlorosilane $SiHCl_3$, admixed, if necessary, with a hydrocarbon compound such as methane to deposit a fine powder of silicon carbide, (3) a method of pyrolyzing a high-polymeric polycarbosilane and (4) a method in which a powdery mixture of silicon dioxide $SiO_2$ and carbon is heated at a high temperature.

Each of these methods has its own advantages and disadvantages and none of them is quite satisfactory when industrial production of such a silicon carbide powder is desired. For example, the first method of the pulverization of silicon carbide is, although this method is suitable for the preparation of a powder of $\alpha$-SiC, industrially very disadvantageous due to the extreme hardness of silicon carbide which necessarily makes the process of pulverization very expensive in addition to the difficulties in obtaining a finely pulverized powder in the submicron range in a high yield without contamination. The second method is, even by setting aside the problem of the extremely high temperature for the pyrolysis, disadvantageous due to the relatively low yield of the powdery silicon carbide, which is crystallographically the $\beta$-SiC. In addition, when the starting silane compound subjected to the pyrolysis is a chlorine-containing silane, the resultant silicon carbide powder always cannot be free from a trace amount of chlorine as an impurity which adversely affects the properties of the sintered body of silicon carbide. Disposal of the hydrogen chloride formed by the pyrolysis of the chlorine-containing silane as a byproduct is also a difficult matter. The silane $SiH_4$ as an alternative starting compound in the second method is a very dangerous material and must be handled with utmost care to avoid hazardous explosion. Moreover, the quite large difference in the velocity of pyrolysis between this silane and the hydrocarbon compound admixed therewith may sometimes lead to the formation of a cluster-like mixture of elementary silicon and free carbon produced separately from the respective starting compounds. Further, the third method has a problem of the expensiveness of the polycarbosilane which is produced in a complicated process in addition to the relatively low purity and relatively coarse particle size distribution of the resultant silicon carbide necessitating troublesome and expensive post-treatment. The fourth method is disadvantageous due to the extremely high reaction temperature in addition to the problem of low purity of the product which may contain elementary silicon as a byproduct besides the unreacted starting materials also necessitating expensive post-treatment.

SUMMARY OF THE INVENTION

An object of the present invention is therefore to provide a novel and improved method for the preparation of a finely divided powder of silicon carbide free from the above described problems in the prior art methods.

The method for the preparation of a finely divided powder of silicon carbide provided by the present invention comprises pyrolyzing a vaporizable organosilicon compound having at least two silicon atoms in a molecule or, in particular, a polysilane compound represented by the general formula $R_{2n+2}Si_n$, in which n is a positive integer of 2, 3 or 4 and each R is a hydrogen atom or a monovalent hydrocarbon group, at least one but not all of the groups denoted by R in a molecule being a hydrogen atom, at a temperature of 750° C. or higher in the vapor phase. The above given general formula and definitions of the symbols prerequisitely exclude an oxygen or halogen atom directly bonded to the silicon atom.

Figure 3:
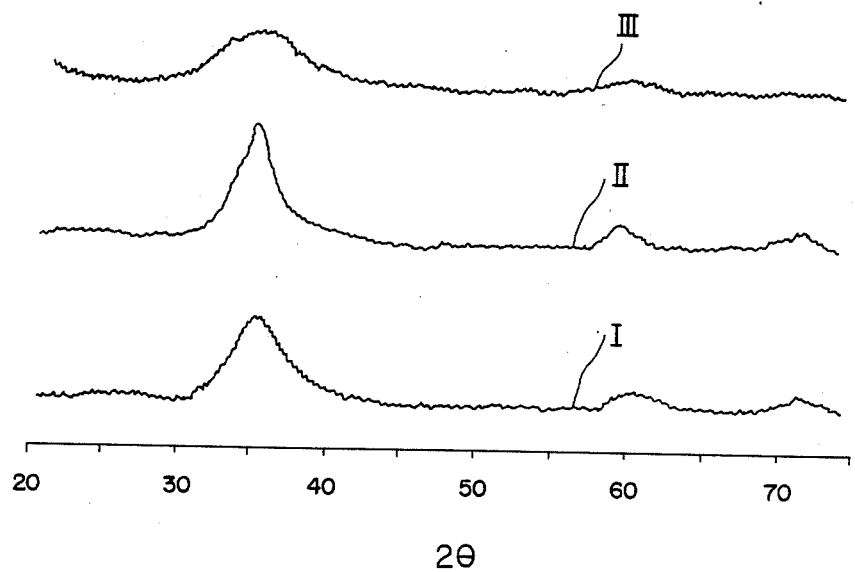

Curves I, II and III in FIG. 3 are each an X-ray diffractometric diagram of the finely divided silicon carbide powder prepared by the vapor-phase pyrolysis of an organosilicon compound.

Figure 4:
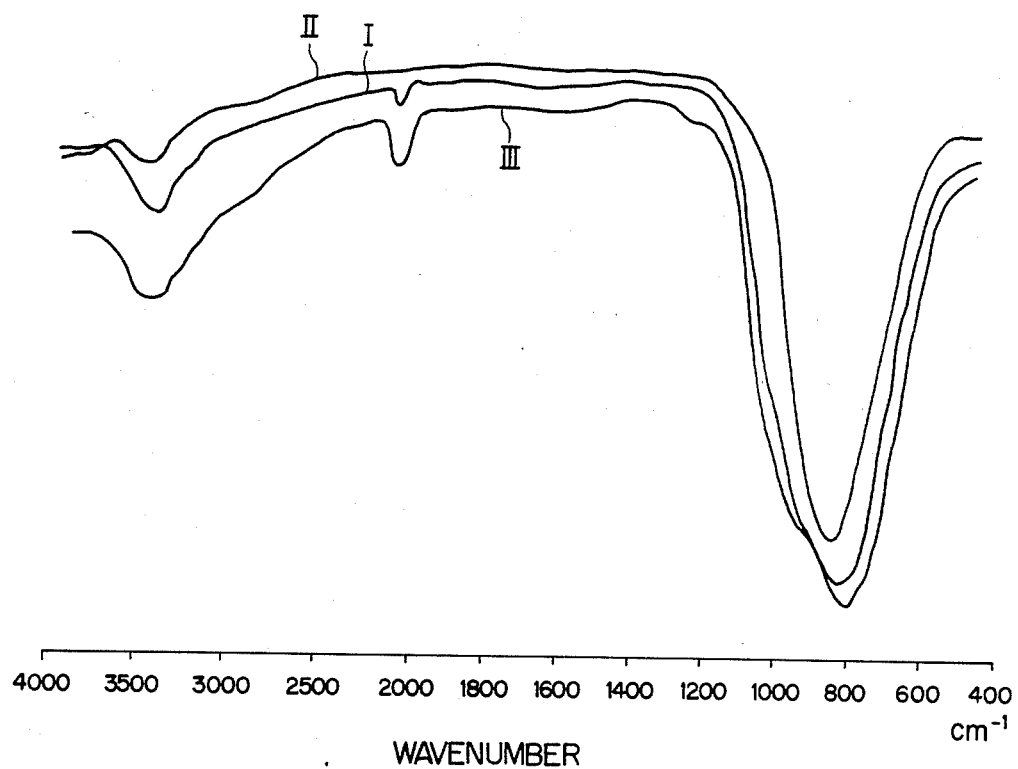

Curves I, II and III in FIG. 4 are each an infrared absorption spectrum of the finely divided silicon carbide powder prepared by the vapor-phase pyrolysis of an organosilicon compound.

DETAILED DESCRIPTION OF THE PREFERRED EMBODIMENTS

The above described method of the present invention has been completed as a result of the extensive investigations undertaken by the inventors with an object to develop a novel and improved method for the preparation of a finely divided powder of silicon carbide suitable for the preparation of a sintered ceramic material free from the problems and disadvantages of the prior art methods with an assumption that the vapor-phase pyrolysis of a vaporizable organosilicon compound may be at the nearest to the goal among the methods.

The investigations have led to a discovery that a vaporizable organosilicon compound or a polysilane compound represented by the above given general formula having, in a molecule, at least one hydrogen atom directly bonded to the silicon atom but having no oxygen or halogen atom directly bonded to the silicon atom may be readily pyrolyzed with excellent workability and high efficiency at a relatively low temperature of around 1000° C. or even lower to form a finely divided powder of silicon carbide of high purity in a good yield. Besides, the powdery silicon carbide obtained by this method may have a crystallographic form of α-SiC by increasing the temperature of pyrolysis to 2000° C. or higher. On the other hand, a similar reaction of pyrolysis with an organosilicon compound having a silicon-bonded halogen, e.g. chlorine, atom must be performed at a higher temperature of 1500° to 1600° C. and the silicon carbide powder formed in this case is always not free from a trace amount of chlorine as an impurity. Further, the use of an organosilicon compound having a silicon-bonded oxygen atom in the molecule may lead to the problem of remaining oxygen content in the silicon carbide even when the reaction of pyrolysis is performed in a strongly reducing atmosphere.

The starting material used in the inventive method is, as is described above, a vaporizable organosilicon compound having, in a molecule, at least two silicon atoms and at least one silicon-bonded hydrogen atom but no silicon-bonded oxygen or halogen atom. The organosilicon compounds are mostly liquid at room temperature and is subject without particular problems to complete purification by rectifying distillation under atmospheric or superatmospheric pressure relative to the heteroatoms other than silicon, carbon and hydrogen. Such an organosilicon compound is typically an organopolysilane represented by the general formula $R_{2n+2}Si_n$, in which R is a hydrogen atom or a monovalent hydrocarbon group such as methyl, ethyl, propyl, phenyl and vinyl groups, at least one but not all of the groups denoted by R being hydrogen atoms, and n is a positive integer of 2, 3 or 4.

Alternatively, the organosilicon compound used as the starting material in the inventive method may be a silhydrocarbylene compound represented by the general formula $R_3Si\text{---}(R^1\text{---}SiR_2)_m R$, in which R is a hydrogen atom or a monovalent hydrocarbon group as defined above, $R^1$ is a methylene, an ethylene or a phenylene group and m is a positive integer of 1 or 2. It is optional that the organosilicon compound may have the polysilane linkage —Si—Si— and the silhydrocarbylene linkage —Si—$R^1$—Si— in the same molecule.

Several of the examples of the organosilicon compounds suitable as the starting material in the inventive method are shown by the following structural formulas, in which the symbols Me, Et, Pr, Ph and Vi denote methyl, ethyl, propyl, phenyl and vinyl groups, respectively:

H—SiMe$_2$—SiMe$_2$—H;   Me—SiH$_2$—SiH$_2$—Me;
H—SiMe$_2$—SiMe$_2$—SiMe$_2$—H;
H—SiMe$_2$—CH$_2$—SiMe$_2$—H;   Me—SiH$_2$—CH$_2$—CH$_2$—SiH$_2$—Me;
H—SiMe$_2$—CH$_2$—SiMe$_2$—CH$_2$—SiMe$_2$—H;
H—SiMe$_2$—CH$_2$—CH$_2$—SiMe$_2$—H;
H—SiMe$_2$—C$_6$H$_4$—SiMe$_2$—H; and H—SiMe$_2$—CH$_2$—SiMe$_2$—SiMe$_2$—H.

These compounds may be used either alone or as a mixture of two kinds or more according to need. Among the above named organosilicon compounds, preferred ones are 1,1,2,2-tetramethyldisilane and other methyl hydrogen disilanes as well as 1,1,2,2,3,3-hexamethyltrisilane due to the easiness in handling, the relatively high reaction velocity in comparison with the monosilane compounds and the inexpensiveness as well as the higher sinterability of the silicon carbide powder prepared from these polysilane compounds in comparison with the silicon carbide powder prepared from a monosilane compound. In particular, a mixture of several dimethylpolysilanes having silicon-bonded hydrogen atoms obtained by the pyrolysis of a high polymeric dimethylpolysilane expressed by the formula $\text{---}(SiMe_2)_x\text{---}$, in which x is a positive integer, at a temperature of 350° C. or higher is suitable as such without further separation into the individual components.

In practicing the inventive method, the above named organosilicon compound or compounds are vaporized and the vapor under approximately atmospheric pressure is introduced into a reaction zone kept at the reaction temperature where the organosilicon compounds are pyrolyzed to form silicon carbide in a powdery form. It is preferable that the vapor of the organosilicon compound is carried by a diluent or carrier gas which may be hydrogen gas or an inert gas such as nitrogen, helium, argon and the like or a mixture thereof.

The temperature of the reaction zone should be kept at 750° C. or higher in order to obtain the desired powder of silicon carbide in a good yield because the velocity of the pyrolysis reaction is low at a temperature lower than 750° C. in addition to the formation of a tarry material decreasing the yield of the desired product as a result of the incomplete pyrolysis even with a prolonged staying time of the starting organosilicon compound in the reaction zone. When a relatively high velocity of pyrolysis is desired, the temperature of the reaction zone should be kept at 1100° to 1300° C. When such a relatively high temperature is undertaken for the pyrolysis reaction together with the use of a relatively large volume of hydrogen gas as the carrier or the use of a starting organosilicon compound having a relatively large amount of the silicon-bonded hydrogen atoms, the atmosphere of the reaction in the reaction zone may be excessively reducing so that elementary silicon may eventually be formed along with the desired silicon carbide. Such an undesirable side reaction may be prevented by admixing the vapor of the starting organosilicon compound or compounds with the vapor of a hydrocarbon compound such as methane, ethane, ethylene, propylene, acetylene, benzene, toluene and the like in an amount not exceeding equimolar to the organosilicon compound.

When the above described method of the present invention is performed at a pyrolysis temperature in the range from 1100° to 1300° C., the powdery silicon carbide formed in the reaction zone is mainly composed of the β-SiC in the crystallographic form. When a powdery silicon carbide mainly composed of the α-SiC in the crystallographic form is desired, it is necessary to carry out the reaction of pyrolysis at a temperature of 1800° C. or higher or, preferably, 2000° C. or higher. A convenient means for performing the pyrolysis at such a high temperature is the use of high temperature plasma to maintain the temperature of the reaction zone.

When the reaction of pyrolysis is performed at a temperature lower than 1000° C., on the other hand, the product of the powdery silicon carbide is mainly composed of the β-SiC in the crystallographic form as examined by the X-ray diffractometry although the peak for the β-SiC in the X-ray diffractometric diagram is rather broad. Further, the infrared absorption spectrometry undertaken with such a silicon carbide powder produced by the pyrolysis at a relatively low temperature of 750° to 1000° C. indicates the weak absorption bands in the spectrum at 2100 cm$^{-1}$ and 1260 cm$^{-1}$ assigned to the linkages of Si—H and Si—CH, respectively. The intensity of these absorption bands increases as the temperature of the pyrolysis is decreased indicating the formation of certain unidentified compounds which may be the precursor of the silicon carbide. The color of the product obtained by the low-temperature pyrolysis is light yellow to light brown in contrast to the deeper color, i.e. brown to blackish brown, of the product obtained by the pyrolysis at a temperature of 1000° C. or higher. Such a silicon carbide powder containing the precursor compounds may have its own advantage in the higher susceptibility to sintering.

Figure 1:
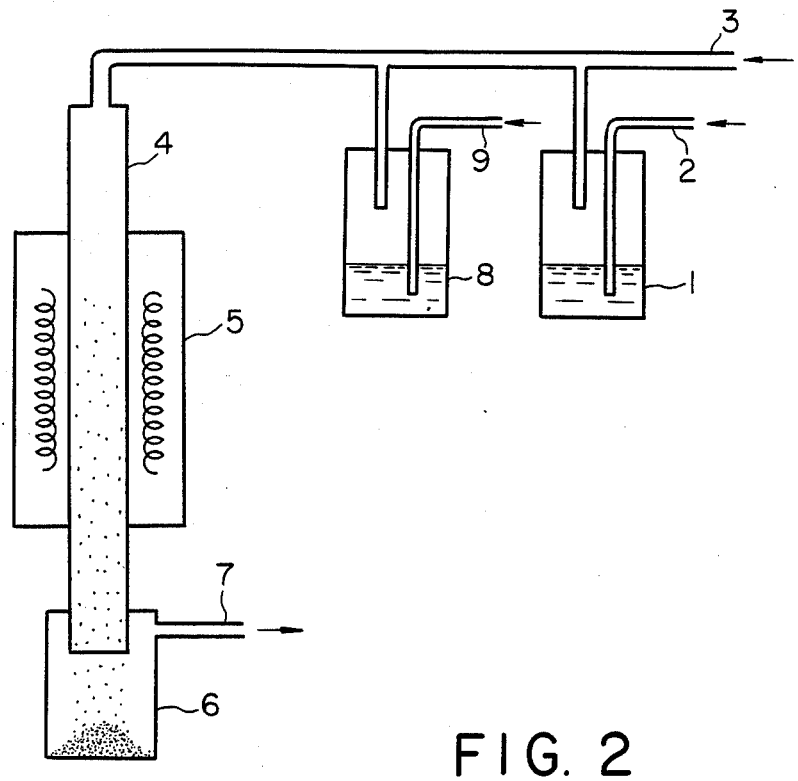
FIGS. 1 and 2 are each a schematic illustration of the apparatus used in the inventive method.
Figure 2:
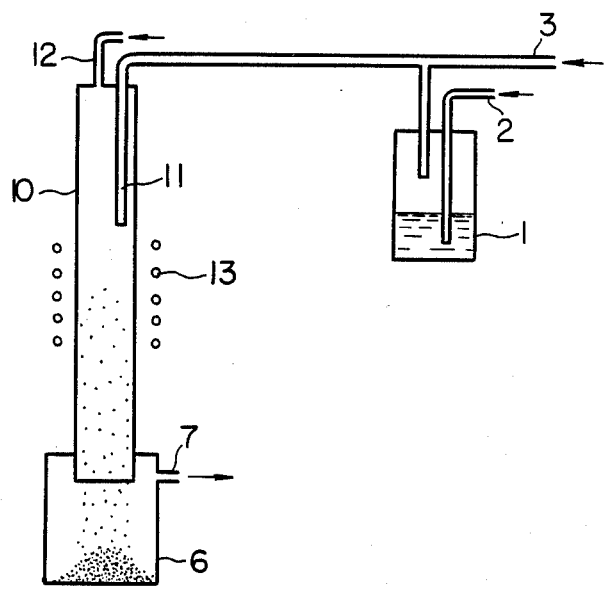

In the following, the method of the present invention is described in further detail with reference to the accompanying drawing, of which FIGS. 1 and 2 are each a schematic illustration of the apparatus used in carrying out the method of the invention. Specifically, FIG. 1 is for the apparatus with an upright tubular electric furnace and FIG. 2 is for the apparatus with a reactor column heated by a plasma flame.

When the inventive method is practiced by use of the apparatus illustrated in FIG. 1, the starting organosilicon compound, assuming that it is liquid at room temperature, is taken in the vessel 1 and the carrier gas such as hydrogen or an inert gas is introduced thereinto at a controlled rate through the gas inlet 2 and bubbled in the liquid organosilicon compound kept at an appropriate temperature. The vaporized organosilicon compound thus carried by the stream of the carrier gas is, if necessary, further diluted with the carrier gas introduced through another gas inlet 3 and introduced into an upright reactor column 4 at the top thereof heated in a tubular electric furnace 5 at a desired reaction temperature of 750° C. or higher. The organosilicon compound is readily pyrolyzed in the reaction zone kept at this temperature to form silicon carbide in a powdery form which is deposited on the walls of the reactor column 4 or falls down to the bottom of the receiver vessel 6 installed at the bottom of the reactor column 4. The exhaust gas freed from the silicon carbide powder and composed of the carrier gas and some of the vapor of the unpyrolyzed organosilicon compound is discharged out of the gas exit 7 and, if necessary, recycled with recovery of the organosilicon compound.

When it is necessary to admix the vapor of the organosilicon compound with a vapor of a hydrocarbon compound for the reason above mentioned, another liquid vessel 8 containing the hydrocarbon compound, assuming it is liquid at room temperature, is installed in parallel with the vessel 1 containing the organosilicon compound and the carrier gas is also blown into the hydrocarbon compound through a third gas inlet 9 so that the vapor of the hydrocarbon compound carried by the carrier gas is mixed with the vapor of the organosilicon compound also carried by the carrier gas. When the hydrocarbon compound is gaseous at room temperature, the liquid vessel 8 may be omitted and the gaseous hydrocarbon compound contained in a suitable vessel, e.g. gas cylinder, is directly introduced into the gas inlet 9 connected to the main line coming from the inlet 3.

When the heating means of the reaction zone is provided by a plasma atmosphere instead of heating in an electric furnace, an apparatus schematically illustrated in FIG. 2 may be used, in which the vapor of the organosilicon compound vaporized in the vessel 1 by the carrier gas introduced through the gas inlet 2 is further diluted with the carrier gas coming from another gas inlet 3 and introduced into the reactor column 10 through the gas nozzle 11. On the other hand, a plasma-supporting gas such as argon is introduced into the reactor column 10 through another gas nozzle 12 and a plasma atmosphere is formed in the zone surrounded by a high frequency work coil 13 connected to a high frequency generator (not shown in the figure) so that the vapor of the organosilicon compound is pyrolyzed in this reaction zone and the powdery silicon carbide formed there is deposited on the walls of the reactor column 10 or falls down to the bottom of the receiver vessel 6 installed at the bottom of the reactor column 10. The exhaust gas composed of the vapor of the unpyrolyzed organosilicon compound, the carrier gas and the plasma-supporting gas is discharged out of the gas exit 7 similarly to FIG. 1.

Following are the examples to illustrate the inventive method in more detail but not to limit the scope of the invention in any way.

EXAMPLE 1

Into a quartz glass-made reactor tube having an inner diameter of 50 mm and a length of 1000 mm and heated at 1200° C. in an upright tubular electric furnace in the manner illustrated in FIG. 1 was introduced vapor of 1,1,2,2-tetramethyl disilane at a rate of 2 g/minute as carried by hydrogen gas in a flow rate of 1000 ml/minute. A blackish yellow fine powder was immediately formed in the reactor tube which was deposited on the walls of the reactor tube and on the bottom of the receiver vessel installed at the bottom of the reactor tube. After 1 hour of continued running in this manner, the electric power for the electric furnace was turned off and the flowing gas through the reactor tube was switched to hydrogen gas alone by interrupting the vapor of the disilane compound to cool the reactor tube to room temperature followed by disassembling of the reactor tube and the receiver vessel, from which the powdery product was scraped off and collected. The amount of the thus obtained blackish yellow powder was 58.6 g with a yield of 72.0% based on the starting disilane compound and the average particle diameter thereof was 0.25 μm. An X ray diffractometric examination of this product indicated that the crystallographic form thereof was β-SiC.

COMPARATIVE EXAMPLE 1

The experimental procedure was substantially the same as in Example 1 except that the starting organosilicon compound was dimethyl dichlorosilane instead of the 1,1,2,2-tetramethyl disilane. In this case, however, almost no deposition of β-SiC was noted even 30 minutes after the start of the reaction with only a small amount of a blackish yellow powder deposited on a part of the reactor column.

When the above reaction procedure was continued for further 30 minutes with the temperature of the reaction zone increased to 1500° C., 8.2 g of a black powder having an average particle diameter of 2 μm were obtained corresponding to a yield of 41.4% based on the starting silane compound along with considerably heavy deposition of a black powdery matter on the walls of the lower portion of the reactor column. This black powder was composed mainly of β-SiC as indicated by the X-ray diffractometry while this powder contained a considerably large amount of chlorine as was evidenced by the qualitative assay for chlorine in which white precipitates of silver chloride were formed by the addition of an aqueous silver nitrate solution to an aqueous suspension of the product powder.

EXAMPLES 2 to 7

The experimental procedures in each of these examples was about the same as in Example 1 although the type of the starting organosilicon compound, the rate of introduction thereof into the reactor column, kind and flow rate of the carrier gas and the temperature of the reaction zone were as indicated in Table 1 which also includes the data for the yield of the product and the average particle diameter of the product. The Remarks (a) to (c) in Table 1 are as follows.
(a) Deposition of silicon carbide was found on the inner walls of the reactor column.
(b) Fine particles were carried by the exhaust gas and particles of elementary silicon were found.
(c) Considerably heavy deposition of silicon carbide was found on the inner walls of the reactor column.

EXAMPLES 8 and 9

In view of the presence of elementary silicon particles contained in the powdery product obtained in Examples 3 described above, the starting organosilicon compound, i.e. 1,1,2,2-tetramethyl disilane, was supplied to the reactor column as admixed with a hydrocarbon compound, i.e. benzene or methane, in a proportion indicated in Table 2 below.

Otherwise, the reaction conditions were much the same as in the preceding examples with the details shown in Table 2 which also includes the values of the yield and the average particle diameter of the silicon carbide product. The particle size was so fine that a considerably large amount of the product was lost in the exhaust gas but no particles of elementary silicon were found.

As is understood from Table 2, no particles of elementary silicon were found in each of the experiments as a result of the combined use of the hydrocarbon compound although an excessively large amount thereof is undesirable due to the formation of free carbon along with silicon carbide.

EXAMPLE 10

The apparatus used here was the reactor provided with a heating means by plasma as is illustrated in FIG. 2. When argon gas was introduced as the plasma-supporting gas, the temperature in the outer periphery of the plasma atmosphere reached about 2300° C. while vapor of 1,1,2,2-tetramethyl disilane was introduced into the reactor column at a rate of 0.5 g/minute as diluted with hydrogen gas flowing at a rate of 50 ml/minute and pyrolyzed in the plasma atmosphere to deposit a blackish yellow fine powder in the receiver vessel at the bottom of the reactor column.

TABLE 2

| Example No. | Organosilicon compound (rate of introduction, g/min.) | (*) Hydrocarbon (molar ratio) | Carrier gas (ml/minute) | Reaction temperature, °C. | Yield of silicon carbide, g (%) | Particle diameter of silicon carbide, μm |
|---|---|---|---|---|---|---|
| 8 | 1,1,2,2-Tetramethyldisilane (0.2) | Benzene (9/1) | Hydrogen (1000) | 1240 | 2.5 (30.7) | 0.05 |
| 9 | 1,1,2,2-Tetramethyldisilane (0.2) | Methane (8/2) | Hydrogen (2000) | 1240 | 2.3 (28.3) | 0.04 |

(*) Molar ratio of organisilicon compound to hydrocarbon

After 1 hour of running of the reaction in the above described manner, 16.5 g of the powdery product having an average particle diameter of 0.18 μm were collected from the receiver vessel. An X-ray diffractometric analysis gave a result that this powdery product was composed of 86% of α-SiC and 14% of β-SiC.

EXAMPLE 11

An alumina-made reactor tube having an inner diameter of 50 mm and a length of 1000 mm was installed in an upright tubular electric furnace and the central portion thereof was heated at 900° C. A stream of hydrogen gas containing 5% by volume of the vapor of 1,1,2,2-tetramethyl disilane was introduced into the reactor tube at the top thereof at a flow rate of 500 ml/minute. After 5 hours of running in the above described manner, the power supply to the furnace was turned off and 19.8 g of a light brown, finely divided powder were collected from the receiver vessel and the walls of the reactor tube. The electron microphotographic study of this powdery product indicated that the particles have a spherical form with an average particle diameter of about 0.45 μm. The yield was 74.0% based on the disilane compound assuming a product composition of SiC. The X-ray diffractometric analysis of this product indicated that the main crystallographic phase of the product was the β-SiC as is shown by the curve I in FIG. 3.

TABLE 1

| Example No. | Organosilicon compound (rate of introduction, g/minute) | Carrier gas (ml/minute) | Reaction temperature, °C. | Yield of silicon carbide, g (%) | Particle diameter of silicon carbide, μm | (*) Remarks |
|---|---|---|---|---|---|---|
| 2 | 1,1,2,2-Tramethyldisilane (1.0) | Hydrogen (1000) | 1100 | 27.7 (68.0) | 0.20 | (a) |
| 3 | 1,1,2,2-Tramethyldisilane (0.2) | Hydrogen (2000) | 1240 | 2.3 (28.3) | 0.06 | (b) |
| 4 | 1,1,2,2-Tramethyldisilane (0.5) | Hydrogen (1000) | 1240 | 13.3 (65.4) | 0.11 | |
| 5 | Bis(dimethylsilyl)methane (3.0) | Hydrogen (2000) | 1230 | 81.3 (74.5) | 0.33 | |
| 6 | Bis(dimethylsilyl)methane (1.5) | Hydrogen (1000) | 1050 | 31.6 (58.0) | 0.43 | (c) |
| 7 | 1.1.2.2.3.3-Hexamethyltrisilane (2.5) | Hydrogen (1000) + argon (1000) | 1280 | 82.3 (73.1) | 0.36 | |

(*) See text.

The infrared absorption spectrum of this powdery product was identical with that of the β-SiC although a very weak absorption band was found at a wavenumber of 2100 cm$^{-1}$ assignable to the linkage of Si—H as is shown by the curve I in FIG. 4.

EXAMPLES 13 to 18

The experimental procedure in each of these Examples was about the same as in the preceding Example although the starting organosilicon compound and the reaction conditions were as shown in Table 3 below which also includes the results of the experiments. Curves II and III in FIG. 3 and curves II and III in FIG. 4 are each an X-ray diffractometric diagram and an infrared absorption spectrum of the product obtained in Examples 18 and 12, respectively. The Remarks (a) to (f) in Table 3 are as follows.

(a) A powder almost white in color showing infrared absorption bands corresponding to Si—H and Si—CH and a very broad peak in the X-ray diffractometric diagram (b) A light yellow powder showing an infrared absorption band corresponding to Si—H (c) A light brown powder showing almost no infrared absorption band corresponding to Si—H (d) A light brown powder showing an infrared absorption band corresponding to Si—H (e) A light yellow powder showing infrared absorption bands corresponding to Si—H and Si—CH (f) A brown powder showing no infrared absorption band corresponding to Si—H Each of the silicon carbide powders obtained in Examples 12 and 18, which was undertaken for comparative purpose, as well as in the preceding Example 11 was molded and subjected to sintering to give a sintered ceramic body of silicon carbide. It was found that the sinterability of the silicon carbide powder obtained in Example 18 was apparently inferior to those obtained in the other Examples.

What is claimed is:

1. A method for preparing a finely divided powder of silicon carbide which comprises pyrolyzing a vaporizable organosilicon compound having, in a molecule, two to four silicon atoms and at least one hydrogen atom directly bonded to at least one of said silicon atoms, said molecule having no oxygen or halogen atom directly bonded to said silicon atoms and said pyrolysis being carried out at a temperature of 750° C. or higher in the vapor phase.

2. The method as claimed in claim 1 wherein the vaporizable organosilicon compound is an organopolysilane compound represented by the general formula $R_{2n+2}Si_n$, in which R is a hydrogen atom or a monovalent hydrocarbon group, at least one but not all of the groups denoted by the symbol R being a hydrogen atom, and n is a positive integer of 2 to 4 inclusive.

3. The method as claimed in claim 1 wherein the vaporizable organosilicon compound is a silhydrocarbylene compound represented by the general formula $R_3Si(-R^1-SiR_2)_mR$, in which R is a hydrogen atom or a monovalent hydrocarbon group, $R^1$ is a hydrocarbylene group and m is a positive integer of 1 or 2.

4. The method as claimed in claim 1 wherein the vaporizable organosilicon compound in the vapor phase is diluted with a reducing gas or an inert gas.

5. A method for preparing a finely divided powder of silicon carbide which comprises pyrolyzing a vaporizable liquid consisting essentially of an organosilicon compound having two to four silicon atoms and at least one hydrogen atom directly bonded to at least one of said silicon atoms, said silicon atoms being devoid of oxygen or halogen atoms directly bonded thereto, said pyrolysis being carried out at a temperature of 750° C. or higher in the vapor phase.

6. The method as claimed in claim 5 wherein the vaporizable organosilicon compound is an organopolysilane compound represented by the general formula $R_{2n+2}Si_n$, in which R is a hydrogen atom or a monovalent hydrocarbon group, at least one but not all of the groups denoted by the symbol R being a hydrogen atom, and n is a positive integer of 2 to 4 inclusive.

7. The method as claimed in claim 5 wherein the vaporizable organosilicon compound is a silhydrocarbylene compound represented by the general formula $R_3Si(-R^1-SiR_2)_mR$, in which R is a hydrogen atom or a monovalent hydrocarbon group, $R^1$ is a hydrocarbylene group and m is a positive integer of 1 or 2.

8. The method as claimed in claim 5 wherein the vaporizable organosilicon compound in the vapor phase is diluted with a reducing gas or an inert gas.

TABLE 3

| Example No. | Carrier gas, ratio by volume | Organosilicon compound (concentration, % by volume) | Gas flow rate (ml/minute) | Reaction temperature, °C. | Yield of silicon carbide, g (%) | Particle diameter of silicon carbide, μm | (*) Remarks |
|---|---|---|---|---|---|---|---|
| 12 | $H_2 + N_2$ (3:1) | 1,1,2,2-Tetramethyl-disilane (8) | 400 | 780 | 24.8 (72.3) | 0.55 | (a) |
| 13 | $H_2$ | 1,1,2,2-Tetramethyl-disilane (10) | 400 | 850 | 31.8 (74.1) | 0.60 | (b) |
| 14 | $H_2 + Ar$ (1:1) | 1,2-Dimethyldisilane (5) | 400 | 820 | 15.6 (72.8) | 0.30 | (b) |
| 15 | $H_2$ | Bis(dimethylsilyl)methane (5) | 300 | 930 | 12.1 (75.0) | 0.35 | (c) |
| 16 | $H_2 + N_2$ (3:1) | 1,1,2,3,3-Pentamethyltrisilane (3) | 400 | 880 | 14.4 (74.8) | 0.30 | (d) |
| 17 | $H_2$ | 1,1,2,3,3-Pentamethyltrisilane (3) | 300 | 790 | 10.3 (71.0) | 0.20 | (e) |
| 18 | $H_2 + Ar$ (2:1) | Ethylsilane (5) | 500 | 970 | 10.1 (75.2) | 0.35 | (f) |

(*) See text.